A. F. O'CONNOR.
GEARING FOR EMERY WHEEL GRINDERS.
APPLICATION FILED JUNE 7, 1915.

1,194,534.

Patented Aug. 15, 1916.

Witnesses

Inventor
A. F. O'Connor.
By
Attorneys

UNITED STATES PATENT OFFICE.

ALBERT F. O'CONNOR, OF NEW HAMPTON, IOWA.

GEARING FOR EMERY-WHEEL GRINDERS.

1,194,534.

Specification of Letters Patent.   Patented Aug. 15, 1916.

Application filed June 7, 1915.   Serial No. 32,671.

*To all whom it may concern:*

Be it known that I, ALBERT F. O'CONNOR, a citizen of the United States, residing at New Hampton, in the county of Chickasaw, State of Iowa, have invented certain new and useful Improvements in Gearing for Emery-Wheel Grinders; and I do hereby declare the following to be a full, clear, and exact description of the invention, such as will enable others skilled in the art to which it appertains to make and use the same.

The present invention is directed to improvements in gearing for emery grinders, and has for its object to provide a device of this character so constructed that the emery wheel may be properly rotated in a direct or reverse direction.

A further object of the invention is to provide a novel form of frame for supporting the driving and reversing mechanism.

With these and other objects in view, this invention resides in the novel features of construction, formation, combination and arrangement of parts to be hereinafter more fully described, claimed and illustrated in the accompanying drawing, in which:—

Figure 1:
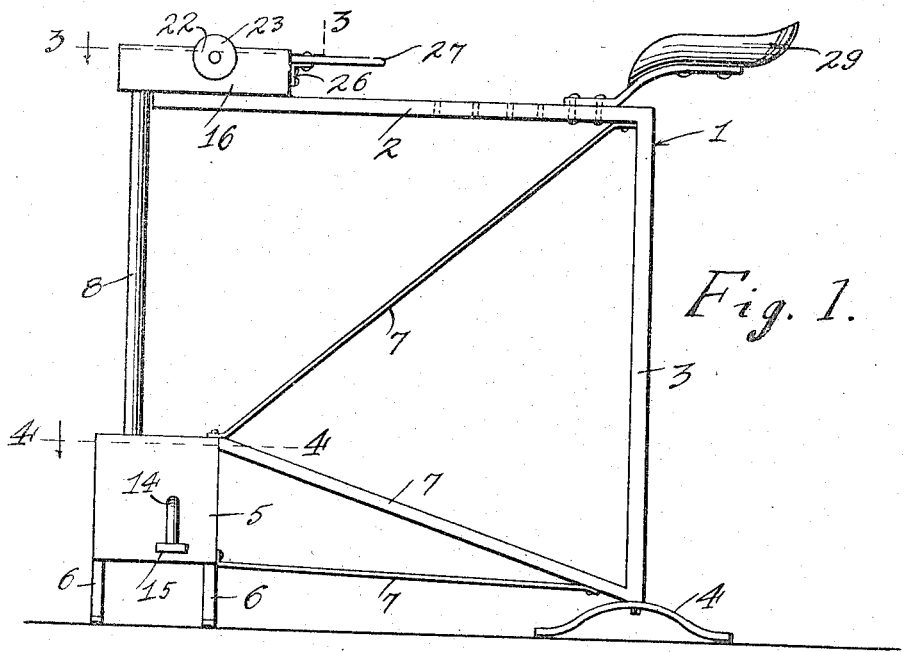
Figure 3:
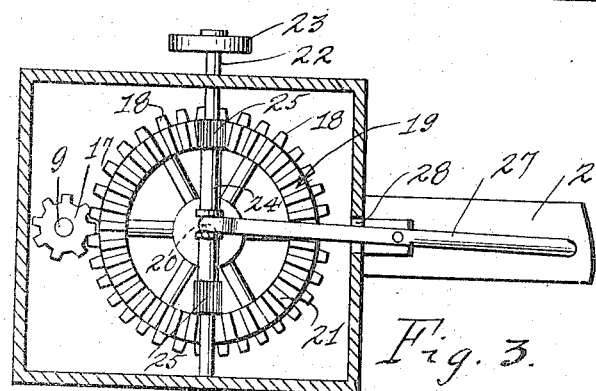
Figure 2:
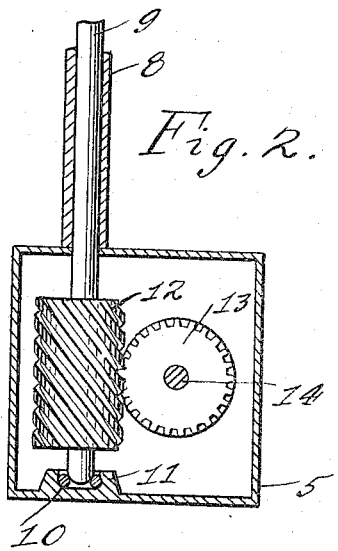
Figure 4:
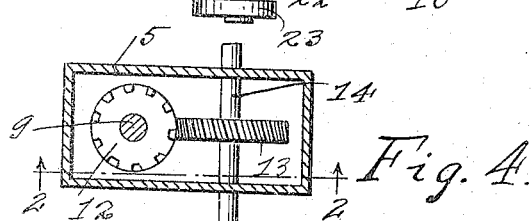

Figure 1 is a side elevation of the device. Fig. 2 is a sectional view on line 2—2 of Fig. 4. Fig. 3 is a similar view on line 3—3 of Fig. 1. Fig. 4 is a similar view on line 4—4 of Fig. 1.

Referring to the drawing the numeral 1 designates a frame, which consists of a top bar 2 and a rear bar 3, said rear bar having its lower end provided with supporting legs 4. A casing 5 is provided, and is supported by legs 6, said casing being connected to the rear bar 3 by brace bars 7. Connecting the forward end of the top bar 2 and top of the casing 5 is a tube 8, and in which is rotatably mounted a shaft 9, the lower end of which extends into the casing 5 and rests on the ball bearing 10, which is supported in the socket member 11, said socket member being fixed to the bottom of the casing 5. The lower end of the shaft 9 is provided with a worm gear 12, which meshes with the gear 13, which is fixed to the horizontal shaft 14, said shaft being journaled in the sides of the casing and has its outer ends connected to pedals 15, which when operated serve to rotate the shaft 9.

Mounted at the junction of the top bar 2 and tube 8 is a transversely disposed casing 16, and into which the upper end of the shaft 9 projects. Fixed to the upper end of the shaft 9, and located within the casing 16 is a pinion 17, which meshes with the peripheral teeth 18 of the gear wheel 19, said gear wheel being rotatably mounted on the stub shaft 20 supported in the casing 16. The upper surface of the rim of the wheel 19 is provided with a circular series of teeth 21, the purpose of which will appear later. Rotatably supported longitudinally of the casing 16 is a shaft 22, the opposite ends of which project beyond the ends of the casing 16, and have mounted thereon emery wheels 23, which rotate with the shaft 22. Slidably keyed on the shaft 22 is a sleeve 24, the ends of which are provided with gears 25, which are adapted to alternately engage with the teeth 21 on the gear wheel 19 so that the rotation of the shaft 22 may be reversed, when desired. A bracket 26 is carried by the casing 16 and has pivotally connected thereto a lever 27, which is operable in a slot 28 formed in the casing, and has its inner end engaged with the sleeve 24, whereby said sleeve may be shifted longitudinally of the shaft 22 so that either one of the gears 25 may mesh with the teeth 21.

Adjustably supported by the top bar 2 is a seat 29, and by adjustably mounting the seat, it is obvious that the same may be moved to suit the comfort of the operator.

What is claimed is:—

1. A device of the class described comprising a frame, upper and lower casings supported by the frame, a longitudinal shaft mounted in the upper casing, means associated with the upper casing for reversing the rotation of said shaft, gear wheels mounted in the upper and lower casings, a shaft operatively connecting said gears, and means for operating the gear in the lower casing to rotate the last named shaft, and thus the gear wheel in the upper casing, as and for the purpose set forth.

2. A device of the class described, comprising a frame consisting of a top bar and rear bar, upper and lower casings, the latter having supporting legs, brace bars connecting the lower casing and rear bar, said upper casing being connected to the lower casing by a tube, a shaft mounted in the tube and having its ends projected into the respective casings, gear wheels mounted in the upper and lower casings, and operatively connected to the shaft, means for rotating the gear in the lower casing, and thus the shaft, the gear in the upper casing having its upper surface provided with a circular series of teeth, a horizontal shaft rotatably supported by the upper casing, a sleeve slidably keyed to the horizontal shaft and having gears carried by its ends, and means for shifting the sleeve to cause the gears to alternately engage the circular series of teeth, as and for the purpose set forth.

In testimony whereof, I affix my signature, in the presence of two witnesses.

ALBERT F. O'CONNOR.

Witnesses:
Jos. W. Krieger,
S. L. Beall.